(12) United States Patent
Hooper

(10) Patent No.: US 9,221,011 B2
(45) Date of Patent: Dec. 29, 2015

(54) METHOD AND SYSTEM FOR REDUCING INDUSTRIAL EMISSIONS

(75) Inventor: Barry Neil Hooper, Melbourne (AU)

(73) Assignee: REDEEM CCS PTY LTD, Melbourne, Victoria (AU)

( * ) Notice: Subject to any disclaimer, the term of this patent is extended or adjusted under 35 U.S.C. 154(b) by 0 days.

(21) Appl. No.: 13/809,936

(22) PCT Filed: Jul. 15, 2011

(86) PCT No.: PCT/AU2011/000892
§ 371 (c)(1),
(2), (4) Date: Jan. 14, 2013

(87) PCT Pub. No.: WO2012/006678
PCT Pub. Date: Jan. 19, 2012

(65) Prior Publication Data
US 2013/0142716 A1 Jun. 6, 2013

Related U.S. Application Data

(60) Provisional application No. 61/373,574, filed on Aug. 13, 2010.

(30) Foreign Application Priority Data

Jul. 16, 2010 (AU) .............................. 2010903173

(51) Int. Cl.
*B01D 53/14* (2006.01)
*B01D 53/62* (2006.01)
(Continued)

(52) U.S. Cl.
CPC ............ *B01D 53/62* (2013.01); *B01D 53/1475* (2013.01); *C01B 3/065* (2013.01); *C01B 7/035* (2013.01); *C01D 5/00* (2013.01); *C01D 9/00* (2013.01); *B01D 2251/306* (2013.01);
(Continued)

(58) Field of Classification Search
None
See application file for complete search history.

(56) References Cited

U.S. PATENT DOCUMENTS

2002/0147109 A1  10/2002  Branover et al.
2003/0143149 A1* 7/2003  Braman et al. ............... 423/426
(Continued)

FOREIGN PATENT DOCUMENTS

JP      2004-352587 A    12/2004
WO   WO-2006/034339 A1   3/2006
(Continued)

OTHER PUBLICATIONS

European Search Report dated Dec. 10, 2013 for PCT/AU/2011000892.
(Continued)

*Primary Examiner* — Jennifer A Smith
*Assistant Examiner* — Anita Nassiri Motlagh
(74) *Attorney, Agent, or Firm* — Harness, Dickey & Pierece, PLC

(57) ABSTRACT

The invention relates to a method adapted for integration with a carbonate absorption/stripping process for removal of carbon dioxide, the method and system including the steps of: converting a source of alkali from a first industry to a non-carbonate alkali; feeding the non-carbonate alkali as makeup to a carbonate absorption system for stripping carbon dioxide from emissions from a second industry; recovering an output from the system for stripping carbon dioxide, and in the process of conversion of the alkali from the first industry, utilising energy from the second industry.

7 Claims, 4 Drawing Sheets

(51) Int. Cl.
*C01B 3/06* (2006.01)
*C01B 7/03* (2006.01)
*C01D 5/00* (2006.01)
*C01D 9/00* (2006.01)

(52) U.S. Cl.
CPC .......... *B01D2257/504* (2013.01); *Y02C 10/04* (2013.01); *Y02C 10/06* (2013.01); *Y02E 60/36* (2013.01)

(56) References Cited

U.S. PATENT DOCUMENTS

| | | | |
|---|---|---|---|
| 2006/0185985 A1* | 8/2006 | Jones | ............................ 205/508 |
| 2008/0250715 A1* | 10/2008 | Cooper et al. | ........... 48/197 FM |
| 2009/0127127 A1 | 5/2009 | Jones | |
| 2010/0135881 A1 | 6/2010 | Zhou et al. | |

FOREIGN PATENT DOCUMENTS

| WO | 2008/113061 A1 | 9/2008 |
|---|---|---|
| WO | WO-2009/029292 A1 | 3/2009 |
| WO | WO-2009/039445 A2 | 3/2009 |

OTHER PUBLICATIONS

International Search Report for PCT/AU2011/000892, mailed Aug. 10, 2011; ISA/AU.
Borhani et al.; CO2 Capture with Potassium Carbonate Solutions: A state-of-art review; J.Greenhous Gas Conrol; V 41, pp. 142-162; 2015.
Kohl et al.; Gas Purification; 5th ed; 1997; Gulf Pub.Co.; Ch 5, pp. 330-381.

* cited by examiner

METHOD AND SYSTEM FOR REDUCING INDUSTRIAL EMISSIONS

CROSS-REFERENCE TO RELATED APPLICATIONS

This application is a 371 U.S. National Stage of International Application No. PCT/AU2011/000892, filed on 15 Jul. 2011, which claims priority to Australian Patent Application No. 2010903173 filed on 16 Jul. 2010, and the benefit of U.S. Provisional Application No. 61/373,574, filed on Aug. 13, 2010, the contents of which applications are hereby incorporated by reference in their entirety as if fully set forth herein.

FIELD OF INVENTION

The present invention relates to the field of 'green technology' or more particularly the reduction of industrial emissions.

In one form, the invention relates to the capture and purification of carbon dioxide including for the purpose of reducing greenhouse gas emissions from an industrial source such as fossil fuel powered electricity generators and other industrial plant.

In one particular aspect the present invention is suitable for incorporation into a carbon dioxide removal process, whereby the supply chains are further enhanced providing improved life cycle benefits.

It will be convenient to hereinafter describe the invention in relation to the electricity generation industry; however it should be appreciated that the present invention is not limited to that use only and has utility in a wide variety of industries.

BACKGROUND ART

The discussion throughout this specification comes about due to the realisation of the inventor and/or the identification of certain related art problems by the inventor and, moreover, any discussion of documents, devices, acts or knowledge in this specification is included to explain the context of the invention. It should not be taken as an admission that any of the material forms a part of the prior art base or the common general knowledge in the relevant art in Australia or elsewhere on or before the priority date of the disclosure and claims herein.

The 'greenhouse effect' and ongoing atmospheric pollution are significant ecological problems. The main gasses responsible are water vapour, carbon dioxide, methane, nitrous oxide and ozone. The relative contributions of these gasses to atmospheric pollution and the greenhouse effect depend on the characteristics of each gas and its abundance. For example, methane has characteristics that make it significantly more potent than carbon dioxide as a greenhouse gas but carbon dioxide has a greater contribution based on its quantity. The growth of industry and the burning of fossil fuels since the industrial revolution have substantially increased the levels of carbon dioxide in the atmosphere.

Various schemes have been mooted for reduction in greenhouse gas emissions. Many economists believe that putting a price on carbon is an essential starting point—that is, putting a price on carbon so that there is an incentive for people to stop emitting greenhouse gasses.

Large scale removal of carbon dioxide from industrial sources to avoid atmospheric emission is an ongoing problem. Processes for acid gas removal are well known and used widely. However, it is costly to achieve significant reduction of industrial carbon dioxide emissions, and improving the cost effectiveness is an ongoing challenge. Processes for carbon dioxide removal have an impact on the cost of downstream goods/services. Accordingly, the process cost must be balanced against this impact if the process is to be acceptable to the relevant industry. In a carbon constrained world, all industries are exposed to carbon dioxide emission costs, irrespective of which process (if any) they choose. Processes or systems that drive down the costs of carbon dioxide removal either through improved technological solutions, lower life cycle costs or reduced supply chain impacts are likely to be preferred. Those who develop such processes or systems at an early stage of the technology may concomitantly be able to take advantage of the opportunity to earn early benefits.

For example, some industries are adopting a new process for avoiding carbon dioxide emission to the atmosphere by capture, concentration and storage of the carbon dioxide in deep geological structures. This is known as carbon capture and storage (CCS). The capture stage of CCS removes carbon dioxide from various fossil fuel burning sources and three alternative approaches form the basis of the majority of research, Post Combustion (PCC) which takes low pressure gas from conventional fossil fuel burning sources and removes pure carbon dioxide Pre-Combustion which removes carbon dioxide from high pressure sources such as synthesis gas prior to complete combustion for power and/or further product synthesis and, Oxyfuels where air is replaced by oxygen for combustion of fossil fuels thereby simplifying carbon dioxide separation.

The cost benefit varies from industry to industry. For example, the electricity production industry will assess the use of CCS systems based on the cost of electricity generation and the commercial impact in the relevant power markets.

On a purely commercial assessment (setting aside early stage transitional development phases and the incentives that may be available) CCS is likely to only be acceptable from the point in time when overall technology costs intersect with carbon dioxide prices (see FIG. 5). Processes or systems that drive down the costs of CCS and the resulting impacts on products, such as the cost of power as measured by the levelised cost of electricity (LCOE), either through improved technological solutions, lower life cycle costs or reduced supply chain impacts are likely to be preferred and help accelerate building of a large scale CCS industry. This will provide concomitant opportunities to owners of such technologies to earn early benefits.

Some CCS applications provide by-product or service benefits. These include the use of carbon dioxide for enhanced oil recovery (EOR) or the production of liquid fuels from synthesis gas. The latter has been successfully used for production of liquid fuels from coal gasification with CCS. The inclusion of a revenue stream rather than sole reliance on carbon pricing to justify investment provides motivation for early adoption of CCS.

Nitrogen compounds (mainly amines and ammonia) have been a focus for research into carbon dioxide capture processes. The use of alkali carbonate processes has been less actively pursued. Even less interest has been shown in identifying the fate of impurities such as sulphur and nitrogen and optimising their downstream uses other than through the addition of flue gas desulphurisation and nitrogen removal equipment to limit consumption of, and adverse reactions with solvents. The proponents of the chilled ammonia process refer to the production of ammonium sulphate as a fertiliser by product. Recently concerns about the fate of nitrogen based degradation products such as nitrosamines has created increased research into amine based solvents in PCC and concerns regarding their fate.

Most activity relating to reduction in the overall cost of carbon capture has been directed to either consideration of the process itself or the product/service opportunities described above. Historically amines have represented the most energy and cost efficient target for emission systems already fitted with impurities handling units such as flue gas desulphurization (FGD) units.

Accordingly, there has been a disproportionate amount of research directed to amine based capture routes which only produce waste products.

Comparatively little attention has been paid to other processes for carbon capture. These waste streams would have significant impact on the makeup rates and supply chains for the base solvent. In the case of amine the rates of consumption (calculated as the product of the specific losses of solvent, measured in kilograms solvent per tonne of carbon dioxide, and the large quantities of carbon dioxide for capture) will require significant additional capacity in global amine chemicals production. This requirement for additional feedstock supply resulting in the disposal of a waste product would continue to be a logistical and economic burden carried by the technology.

However emerging carbonate options can reduce the energy penalty for carbon dioxide removal and also allow combined removal of carbon dioxide with other impurities. For example, some current processes remove carbon dioxide from industrial emissions by passing the gas through aqueous potassium carbonate solution circulating through an absorption column (sometimes referred to as a scrubber) (see FIG. 4). The basis of this process is (1) hydration of carbon dioxide in a reversible reaction to form carbonic acid, which in turn reacts with a carbonate ion to form two bicarbonate ions (2) (potassium provides the cation in this case though other ions could be used)

  eqn (1)

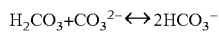  eqn (2)

The process is completed by processing the bicarbonate laden solvent stream to regenerate the carbonate (generally through the application of heat) in a regenerator (sometimes referred to as a stripper) and releasing the carbon dioxide as a purified stream. This process allows the solvent to be recirculated continually for further carbon dioxide removal in a closed loop system with the only makeup being for system losses.

Carbonate absorption/stripping systems like this can be operated in various modes such as PCC, pre-combustion or indeed any application where $CO_2$ is to be removed.

In most solvent processes, particularly with amines which are highly susceptible to attack by other acid gases such as oxides of sulphur, the gas is pre-treated to remove impurities to low levels otherwise the losses of solvent would make the process un commercial.

However in the case of potassium carbonate the reactions of these impurities with the solvent can produce potentially useable by-products. The end products would be potassium sulphate and potassium nitrate which could be reused back In the fertiliser industry from whence the base potassium came. It should be noted the single most important commercial use of potassium products is for fertiliser. The agricultural sector is constantly looking for sources of nitrogen, phosphorus and potassium (commonly referred to as NPK). The broad reactions of these the gas impurities with potassium, using $SO_2$ and $NO_2$ as examples are:

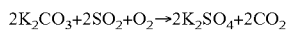

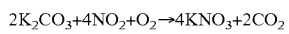

While this example indicates the reactions in an oxidising environment similar reactions can be described for other capture circumstances such as found in syngas or pre-combustion capture applications.

Furthermore, other than for CCS incorporating enhanced oil recovery or returns from syngas fuels, effectively all commercial improvements in CCS, particularly in PCC, focus on cost reductions due to either solvent performance or configurations and heat integration with the power plant leading to reduced variable and/or equipment cost reduction.

There is therefore a need for novel additions to, and configurations of, carbon capture that further improve the life cycle impact and commercial attractiveness of low emission technologies, and particularly when operated in a post combustion mode.

One approach to producing higher value products from carbon dioxide removal has been described in International patent applications WO 2006/034339 and WO 2009/039445. These patent applications teach the use of sodium hydroxide scrubbing on a 'once-through' basis to produce carbonate and bicarbonate products. Significant modifications to electrolysis and scrubbing processes are taught to achieve what is described as ecological efficient removal of carbon dioxide. This process produces a carbonate/bicarbonate product which can be considered either as a by-product or a mineral based method for permanently sequestering carbon dioxide. This differentiates it from other geological methods of carbon dioxide sequestration used for CCS. The prior art patents disclose transportation of the carbonate products to CCS sites, along with chemicals which may be used to generate carbon dioxide for geological storage. However this increases the complexity of the CCS chain.

Given the very large quantities of carbon dioxide emitted from a power station (and the potential need for at least about 90% carbon dioxide removal) the 'once-through' nature of this process creates two problems, namely the internal use of electricity and the large volume of carbonate and other products.

The conventional electrolysis process used to produce the necessary hydroxide for complete conversion of carbon dioxide to carbonate products is in excess of the power available from the power station. For example, FIG. 9F of International patent application WO 2006/034339 indicates that the electrolysis needs exceed the generation of power by 12%. Should that situation be maintained the carbon dioxide removal process (for that purpose alone) would be of little use with no power being available for sale by the generator. WO 2006/034339 teaches a number of modifications and integrations which are necessary for use in the process to recover the heat and power and use them internally to reduce the overall power requirement by the electrolyser.

Furthermore the quantities of product produced from such a process are likely to compromise its usefulness due to the flooding of chemical markets with one or all of the by-products. For example, International application WO 2006/034339 includes exemplification based on a single 1000 MW power station. FIG. 9C of WO 2006/034339 indicates that the combined total carbon dioxide and sodium hydroxide produced by the example, which together approximate the sodium bicarbonate production rate, are over 15 million tonnes per annum. This is in excess of the nameplate capacity of the production of all soda ash producers in the United States in 2003.

Similarly, the chlorine production referred to in FIG. 9D is approximately 6 million tonnes per annum. This may be five to ten times the size of the largest chlorine plants in the world.

Accordingly there is a need for processes and systems for large scale carbon capture and geological storage that provides improved overall cost attractiveness to end users by producing additional useable products.

SUMMARY OF INVENTION

It is an object of the embodiments described herein to overcome or alleviate at least one of the above noted drawbacks of related art systems or to at least provide a useful alternative to related art systems.

Another object of the present invention is to provide a process and system for carbon capture that provides improved overall cost attractiveness to end users by producing additional useable products. Another object of the present invention is to provide a process and system for large scale carbon capture and geological storage that provides improved overall cost attractiveness to end users.

It is a further object of the present invention to provide a carbonate based process and system that provides improved overall cost attractiveness to end users by producing additional useable products.

A further object of the present invention is to alleviate at least one disadvantage associated with the related art.

In a first aspect the present invention provides a method adapted for integration with a carbonate absorption/stripping process for removal of carbon dioxide, the method and system including the steps of:
converting a source of alkali from a first industry to a non-carbonate alkali;
feeding the non-carbonate alkali as makeup to a carbonate absorption system for stripping carbon dioxide from emissions from a second industry;
recovering an output from the system for stripping carbon dioxide, and in the process of conversion of the alkali from the first industry, utilising energy from the second industry.

It will be apparent to the person skilled in the art that in addition to the non-carbonate alkali, $Cl_2$, $H_2$ and HCl may be products of the method.

The alkali component may comprise any convenient alkali metal. Preferably the source of the alkali is potassium chloride, the non-carbonate alkali is potassium hydroxide and the output from the system is chosen from the group comprising potassium sulphate, potassium nitrate, and combinations thereof. As an alternative, the cation may for example, be sodium in stead of potassium.

In a second aspect the present invention provides a method adapted for integration with a carbonate absorption/stripping process for carbon dioxide removal, the method and system including the steps of:
converting a source of potassium chloride from the fertilizer industry to potassium hydroxide, chlorine, hydrogen and hydrogen chloride;
recovering at least some of one or more of the chlorine, hydrogen and hydrogen chloride;
feeding the potassium hydroxide as makeup to a carbonate absorption system for stripping carbon dioxide from emissions from a second industry;
recovering the potassium component of the makeup feed as an output chosen from the group comprising potassium nitrate, potassium sulphate and combinations thereof;
utilising energy from the second industry in the process of conversion of the potassium chloride to potassium hydroxide; and
recovering at least some of the potassium nitrate and/or potassium sulphate.

In a particularly preferred embodiment of the present invention there is a synergistic commercial relationship between the first industry and the second industry, wherein emissions due to energy generated by the second industry are lowered, with concomitant production of additional commercial products by the second industry, some of which may be returned to the first industry. Optimally a third industry may be involved, for example, to operate the conversion process, use or market the additionally produced commercial products, or any product of the process. In this manner there may be collaboration between at least two or at least three industries.

Typically the energy from the second industry is electrical energy. The close coupling, either physically or commercially, between the first industry the second (electricity generating) industry and potentially a third industry is relevant due to a mix of feedstock nature, conversion costs, capture costs and by-product's added value as viewed by each industry respectively.

For example, typically the first industry is the fertiliser industry (providing feedstock), the second is the power industry (generating electricity) and the third is the chemical industry (chemical processing).

The use of sodium and potassium carbonate in the carbon dioxide removal process is beneficial due to its capability to synergistically capture the impurities such as sulphate and nitrate products which potentially offer added value to the first industry. Furthermore close coupling, either physically or commercially, between the conversion of the feedstock from the first industry (fertiliser) in which is often performed by a third industry (chemical), and the second industry (electricity generating) is due to the contribution of electricity to the variable cost of the conversion step to produce makeup hydroxide for the carbonate absorption stripping $CO_2$ capture and removal process. Electricity at the power house gate will always be provided at lower cost to such an energy user. This potentially provides a cost benefit with respect to the additional products and allows new commercial opportunities to emerge which will not only alter the economics of the production of the additional products but also improve the economics of carbon capture.

As previously described, in the past, aqueous potassium carbonate solution has been used in systems for removing carbon dioxide. Instead of using delivered alkali carbonate or alkali hydroxide as makeup to the scrubber, the present invention is directed to the use of other feed(s) derived from an industrial source. Thus the present invention integrates existing alkali supply lines In a way never previously considered. This provides economic advantages over carbonate based scrubbing processes of the prior art. This is particularly desirable for large scale carbon dioxide removal with geological storage from the many industries that rely on fossil fuel. Carbonate based $CO_2$ absorption/stripping removal processes can be applied in a range of applications such as PCC and pre-combustion modes.

The alkali feed with the integration of processes of the present invention may be provided to systems for removing carbon dioxide that additionally include impurity removal devices.

Preferably the alkali is an alkali metal or alkaline earth. More preferably the alkali is sodium or potassium. When the alkali is potassium, the first industry is typically the fertiliser industry for which potassium is a key commodity. Conversely the predominant use of potassium is in the fertiliser industry. The alkali source and alkali feed may be in any form appropriate and convenient for use including solid, solution, suspension or slurry form.

In a second aspect, the present invention provides a method adapted for integration with carbon capture associated with a carbonate absorption stripping carbon dioxide removal process, the method including the steps of:
  converting a source of alkali halide from a first industry to alkali hydroxide;
  providing the alkali hydroxide as makeup to a carbonate absorption stripping system for removing carbon dioxide from emissions from a second industry;
  recovering an output from the system for removing carbon dioxide, the output comprising alkali sulphate and/or alkali nitrate, and
  in the process of conversion of the alkali halide from the first industry, utilising energy from the second industry to additionally produce commercial products.

In a third aspect, the present invention provides a method for integration with carbon capture associated with a carbonate absorption stripping carbon dioxide removal process, the method including the steps of:
  converting a source of alkali halide from the fertilizer industry to an alkali hydroxide and a by-product;
  providing the alkali hydroxide as makeup to a carbonate absorption stripping system for removing carbon dioxide from emissions from a second industry;
  providing the by-product as a feed for one or more industrial processes;
  recovering an output from the carbonate absorption stripping system comprising alkali sulphate or alkali nitrate, and
  in the process of conversion of the alkali from the first industry, utilising energy from the second industry to additionally produce commercial products.

The by-product typically comprises a moiety chosen from the group comprising halide and/or hydrogen. For example the by-product may be chosen from the group comprising halogen gas such as $Cl_2$, hydrogen gas or hydrogen halides such as HCl. In particular, hydrogen gas can be useful as a feed for various industrial process including as a source of fuel for burning, for incorporation into fuel cells or use at the power plant.

The conversion of an alkali halide to an alkali hydroxide for use in large scale CCS is contrary to the wisdom of the prior art for many reasons. Firstly the focus for capture systems of the prior art has been on amines. Where carbonate systems have been used in the past the traditional focus has been on the use of delivered feedstock in the form of carbonate or hydroxide. Where carbonate systems have been suggested for large scale capture systems the conventional approach has similarly been on delivered feedstock. Furthermore the application of hydroxide scrubbing to CCS has in fact taught away from that approach due to the high cost of electrolysis processes. Where opportunities to produce by-products have been made such as through hydroxide scrubbing and carbonate production the high power usage and difficulty of the products markets have further indicated potential problems. Finally the potash industry, as it is called, infers the focus on carbonate based products for delivered products above.

The recognition of features, benefits and needs from a range of previously unrelated industries has resulted in this invention which offers new insights into supply chains and business models for a carbon constrained world not previously consider in the prior art. Preferably the alkali halide is potassium chloride—the lowest cost and major product of the fertilizer industry and together with low cost conversion (using close coupling to power stations) to hydroxide for use in a carbonate absorption scrubbing $CO_2$ capture systems (and other products) and production of sulphate and/or nitrate products for use in the fertiliser industry a range of operating and business models and benefits emerge.

The present invention provides potential for interaction between a wide range of industries. Typically, use of the present invention would involve the fertiliser industry, the power industry (or indeed any carbon dioxide emission source) and the chemical industry. These industries may also be immediate consumers of any, or all, of the products of the present invention. For example, when the method of the present invention is used in a process that removes carbon dioxide from emissions from a fossil fuel burning power plant certain by products can be provided to other uses on-site at the power plant. For example, if the alkali feed is KCl, the $H_2$ by-product can be used in the power plant as a source of fuel for burning or for their chemical value.

Thus the cost associated with using alkali hydroxide as a makeup to the carbon dioxide removal process is offset by using a low cost, high volume product (KCl) from the fertilizer industry converting it with low cost power and the value added by the generation of valuable halide and hydrogen products as well as the basic solvent for the CCS process.

The benefits of the method of the present invention can be increased by co-location of essential elements of the method. For example production of the source alkali can be integrated with the carbon dioxide removal process and facilitate a particularly advantageous business model. For example, the business model could include key linkages involving;
  an alkali halide producer (such as a fertiliser manufacturer) that would consume products of the process such as potassium sulphate and nitrate products,
  a carbon dioxide emitter such as a power company who could provide low emission energy, provide lower cost power for the alkali conversion process and consume some of the additional products (see FIG. 5 showing relative LCOE performance from alternate technologies), and
  the chemical industry who could market and sell products such as chlorine, hydrogen or hydrogen chloride.

A physical and/or commercial linkage between industries to create synergies and centralization of alkali hydroxide production for the benefit of all parties has, to this point, been unrecognized. The present invention may further include the distribution of operating responsibilities between alkali feed conversion, capture plant operation and power plant operation and the handling of chemical materials on and off the site. The present invention provides a framework for a wide range of business models for optimising the skills and contributions of any/all participating industries.

Advantages of the Invention

In essence, embodiments of the present invention stem from:
  (i) the realization that relatively cheap sources of industrial alkali can be directed to unrelated industries through the application of relatively cheap power at source to provide carbon removal benefits, including advantageous products and by-products and overall improved commercial attractiveness for carbon capture, and
  (ii) recognition of features, benefits and needs from a range of previously unrelated industries has resulted in this invention which offers new Insights into supply chains and business models for a carbon constrained world not previously consider in the prior art.

The advantages of the carbonate capture processes of the prior art (to which this present invention can be applied) include the following:
- Use of a non volatile active ingredient which;
  - avoids losses (or processes to limit losses), and.
  - allows wider range of processing conditions ie temperature and pressure
- Avoiding potentially degradation products that can;
  - create potentially harmful environmental discharges, and
  - increase equipment corrosion.
- Potential integration with various industries including, for example, the fertilizer industry;
- Effective reduction in net input costs through the recovery of sulphate/nitrate revenue; and
- Ability to remove carbon dioxide and other impurities in a single absorption step.

Advantages specific to the present invention include the following:
- Improved life cycle for the chemical supply chain compared to other solvent routes (a noted potential advantage of the carbonate capture process of the prior art but one which is enhanced further by this invention);
- Cost effectiveness due to;
  - Use of feed process optimized to the needs of the capture application,
  - Improved cost base that utilizes the offsets from sales of by-product (some of which can be used on site) produced from a lower cost feedstock (eg KCl) and lower power costs,
  - Lower capital expenditure opportunities for the alkali source plant such as the removal of concentration processes for the hydroxide when co-located with the capture plant;
- Offers a number of business models that can allow different cost and profit sharing vis-à-vis chemical revenues, electricity cost and the like;
- Offers a number of operating models that may alter the way different end users wish to engage. This allows different companies to undertake different levels of operating risk either themselves or by joint ventures with other companies that have a better skill base and business model to support the integrated nature of any proposal;
- Can operate in all CCS capture modes using carbonate absorption/stripping and in particular a post combustion mode which in the past has been viewed to be heavily reliant on carbon pricing rather than providing added revenues;
- Uses standard technology offerings such as electrolysis and capture technologies to deliver additional benefits. The benefits arise from the new supply chain linkages and business models rather than the processes per se;
- Can operate in a number of product formulations, including;
  - Potential for altered product off-takes and additional uses contemplated for the products streams. For example, hydrogen could be simply burnt on the power plant, fuel cells might be relevant and in certain circumstances different electrolysers may be incorporated that produce only acid and alkali streams;
- Can be scaled according to the impurity removal required. It can be used either with or without existing flue gas treatment facilities and to some extent the product mix could be varied during operation;
- When the power industry is a participant, the method can provide immediate responsiveness to peak power demands. If the source of alkali is a power based system, the load can be shed to reap the benefits of high power prices. During this time the process is simply operated with lower replenishment thus allowing the impurity levels to build up for later removal with no net loss of carbon dioxide removal. Depending on the amount and extent of higher prices other aspects of the carbonate system can allow further load shedding;
- Provision of a more streamlined and cost effective supply chain for solvent replacement;
- Provision of a range of industrial by-products, potentially of high value. Their production may be more cost effective compared to other sources.
- An improved life cycle for the entire carbon dioxide removal chain and use of an environmentally friendly solvent, such as potassium carbonate;
- Opportunities for alkali producers to open new markets and obtain multiple uses of their product;
- Providing a range of business and operating models not previously considered as part of the CCS debate;
- Potentially offering early introduction of CCS into the power sector as a result of additional revenue streams ahead of, or in the early days of carbon pricing (see FIG. 5 where the addition of revenues from this invention allow for lower LCOE and earlier cross over with carbon pricing which indicates earlier attractiveness of the technology).

The present invention has potential application across several industries including, but not limited to, the fertiliser industry, the power industry and the chemical industry. Accordingly, there are many potentially suitable commercial arrangements that may be associated with the method of the present invention. Despite this the key determinants to the benefits and commercial viability of such close collaboration will be:
- base alkali cost;
- capital and operating cost of the converter;
- power cost to the industry carrying out the conversion;
- capital and operating cost of the capture plant;
- sale price of all by products; and
- carbon reduction incentives/penalties.

The features described above are expected to provide a distinct difference and improvement to, and competitive advantage over, alternative products/processes in this field. The supply chain integration and incorporation of by-products and the exploitation of the benefits of the carbonate process provides significant benefits. Preferably the invention of the present application uses the integration of several industry sectors to create a more streamlined industrial solution. In particular, preferably the present invention offers a range of attractive business models and commercial outcomes to suit a myriad of CCS applications. It may do so by creating a holistic view of the capture problem, recognising the commercial imperative to achieve large scale introduction of this technology and thus providing a better environmental outcome.

Further scope of applicability of embodiments of the present invention will become apparent from the detailed description given hereinafter. However, it should be understood that the detailed description and specific examples, while indicating preferred embodiments of the invention, are given by way of illustration only, since various changes and modifications within the spirit and scope of the disclosure herein will become apparent to those skilled in the art from this detailed description.

DETAILED DESCRIPTION

Further disclosure, objects, advantages and aspects of preferred and other embodiments of the present application may be better understood by those skilled in the relevant art by reference to the following description of embodiments taken in conjunction with the accompanying drawings, which are given by way of illustration only, and thus are not limitative of the disclosure herein, and in which:

FIGS. 1, 2 and 3 illustrate embodiments of the present invention and their placement relative to existing processes to produce a different business model.

Figure 1:
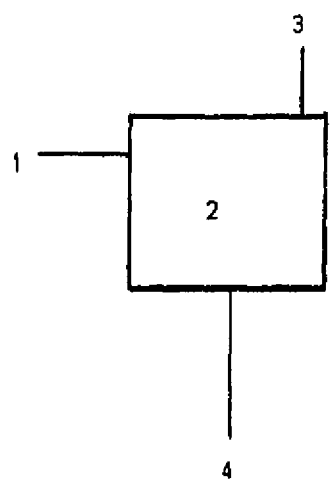
FIG. 1 illustrates a carbonate absorption stripping carbon dioxide removal systems of the prior art.

FIG. 1 illustrates the carbonate absorption stripping carbon dioxide removal systems of the prior art. These systems consume alkali carbonate or hydroxide (1) as makeup to an aqueous carbonate solution in a $CO_2$ removal unit (2) to scrub carbon dioxide (3) from an industrial output. FIG. 1 shows the delivered $K_2CO_3$ and/or KOH makeup and resultant potassium sulphate by product (4). The relevant chemical reactions have been noted previously herein.

The aqueous potassium carbonate process of the prior art has many benefits. The three major positives are (i) it has low volatility and is oxygen tolerant, (ii) it can allow operation as a single capture device for the impurities as well as the carbon dioxide, and (ii) having done so, the potassium can be returned to the fertilizer chain with added value. By-products of the process that contain sulphur and nitrogen have fertilizer value. Any material lost or degraded during such processes using other solvents in the past (and these have been traditionally low in past applications due to the requirements to maintain low contaminant loads) have been replaced by sources that are relatively high cost.

Figure 2:
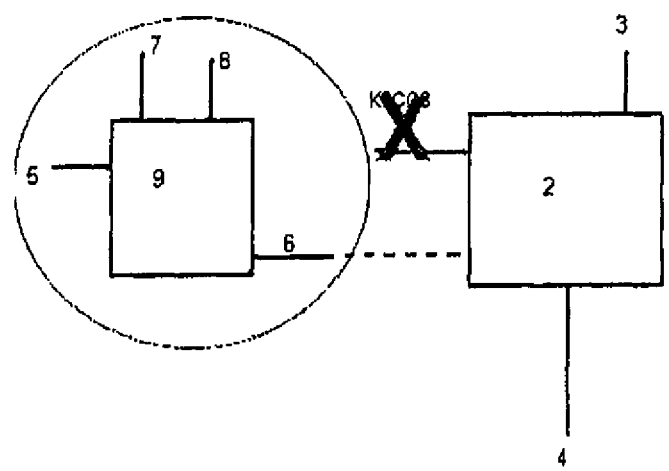
FIG. 2 illustrates the integration with the present invention of a chlor-alkali process fed by potassium chloride.

FIG. 2 illustrates the integration of a chlor-alkali process fed by a potassium chloride feed (5) with the prior art process. This can produce additional products and displace potassium makeup in the form of potassium carbonate with potassium hydroxide. This close coupling produces a totally new concept for removal of carbon dioxide from industrial emissions whereby potassium chloride (5) is fed to an electrolytic process (9) producing potassium hydroxide (6), chlorine (7) and hydrogen (8) in a close coupled configuration with a power plant. The potassium hydroxide (6) is readily used in the $CO_2$ removal process (2) and the by-products of chlorine and hydrogen (produced using low cost power from the power plant) provide valuable offsets to the overall $CO_2$ (3) removal process and low emission from the power plant. The potassium fertilizer products containing sulphur and nitrogen (4) remain as additional benefits to the overall process. Together these flows create a supply chain and a business model that will produce enhanced commercial opportunities and hence is likely to accelerate the uptake of CCS.

The conversion of an alkali halide to an alkali hydroxide is contrary to the prior art which teaches that it is a high cost process. By contrast the present invention has superior integration of the benefits of the potassium fertilizer supply chain, even for the potassium carbonate process. The present invention uses the lowest cost and most prolific potassium products (potassium chloride). It produces make-up potassium as hydroxide, replacing all that is lost as potassium by-products, as well as additional valuable by-products of chlorine and hydrogen. The latter can have on site uses, for example, in power plants. Co-location of the process on a power plant provides potentially the lowest possible power price for the most significant variable cost for chlor-alkali plants. The benefits for the electricity industry offer further commercial attractions for investment.

One of the reasons why these options have not previously been considered is that the issue of carbon dioxide abatement as an emerging cleantech industry is still relatively new. Furthermore, in the acid gas industry the potassium carbonate systems have been progressively replaced by other solvent processes for cost and performance reasons. Consequently potassium carbonate systems have not received much attention or been targeted for research. However, the researchers who have been considering carbonate systems have recognized that the conditions and applications of large scale capture of carbon dioxide are both subtly and fundamentally different to those acid gas removal systems currently in operation. There has not previously been such a pressure to remove carbon dioxide in such quantities, in oxidative as well as reducing environments and potentially with such high replenishment needs (should the impurities be taken out in a single step as described above). The consideration of carbonate systems in itself is an example of reviewing the problem afresh and not relying on necessarily solving the problem with current technologies. This invention adds further to this concept by fundamentally considering the supply chains and preconceptions about the application of technologies such as chlor-alkali and not dismissing them simply on the basis of conventional wisdom.

Figure 3:
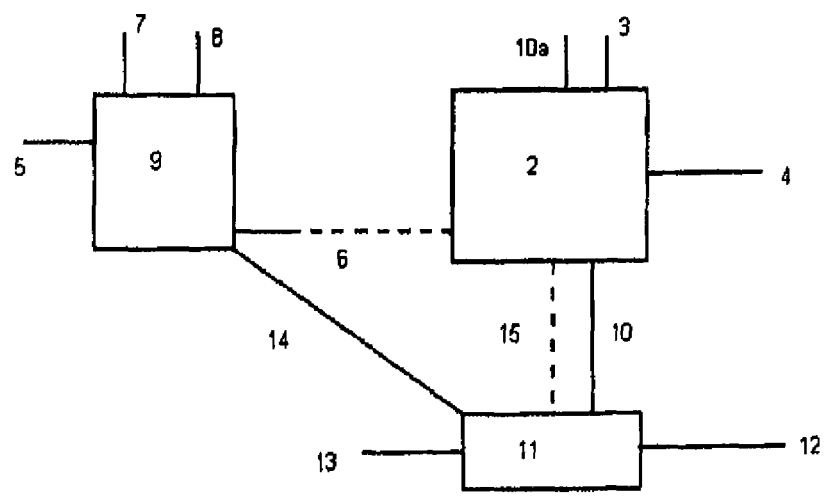
FIG. 3 illustrates the integration of the present invention with existing technology showing a first process (for conversion of the alkali halide), a second process (involving a capture plant) and a power station.

FIG. 3 illustrates the integration of the present invention using existing technologies. A process of first industry (9) takes an alkali halide (5) and converts it to a source of alkali hydroxide (6) for carbon dioxide removal. A second process (2) carries out the carbon dioxide removal (3) for the benefit of a second industry which is a carbon dioxide emitter, such as a conventional power producer. By-products (7,8,4) may be taken off and sold for financial gain. The product (6) of the first process is tied to the second process (2) but the two products (7 and 8) would, principally be sold to the chemical market and the product (4) of the second process would typically be sold via a fertiliser outlet. Another output from the second process (2) is a flue gas stream (10a), being effectively stream (10) emitted by a power plant (11) from which carbon dioxide has been removed and which, in a carbon constrained world, would be expected to have an economic value attributed. Such a process will be operated either by the owner, typically a power plant (11) or other carbon dioxide emitter, or sub-contracted to others depending on the business model chosen. A power plant (11) for example, would burn fuel (13) to deliver power (12) to customers, including delivery of power (14) to the first process (9) and exchange energy flows (15) with the second process (2) to drive the $CO_2$ removal process.

The method and system arises due to the incorporation of experience in a number of chemical industries, the appreciation of the basic drivers in those industries, the supply chain and cost issues in the fertilizer industry and the opportunities that consideration of 'unconventional' application of technologies to the CCS arena can deliver.

The financial case for the provision of low emission power from a carbon dioxide emission source such as a power station is expected to be enhanced compared to other capture processes, by the operation of the process configuration of the present invention including the integrated supply chain of the carbonate process. The capital and operating costs of the single impurity removal process including the first process (9) is expected to be beneficial due to the purchase of the feedstock (5) and the commensurate returns from the sale/supply of products (7,8 and 4) with the benefit of relatively low cost power (14) available to the first process (9).

The present invention has not previously been considered for many reasons including the general perception that the carbonate process is old and not as favourable as more modern processes. Furthermore, other industries have not been viewed as synergistic. For example, the potassium fertilizer industry and its many potassium products has not been seriously considered. Further review of the industry structure shows that KCl is not only the basic and large scale product but also is the cheapest price form. Other forms of potassium (such as $K_2CO_3$ and KOH) are subject to additional processing and hence are more expensive. These processed forms also have special transportation needs.

Apart from salt, electricity is the highest variable cost in chlor-alkali processes and that the cheapest place to produce such products is in association with a power plant. Due to the relatively low replenishment rates in past applications of the potassium carbonate systems the issues of $K_2CO_3$ or KOH have not been considered in depth. It has also not been previously recognised that hydrogen is used in power plants and some plants have'produced hydrogen on site in the past. Finally, in combination with the above points, it has not previously been appreciated that sulphate and nitrate by—products have added value above that of potassium chloride and that the method and process of the present invention may offer changed business models for this form of the fertilizer chain. The overall pricing mix alongside all the revenue streams appears to offer considerable opportunity.

Figure 4:
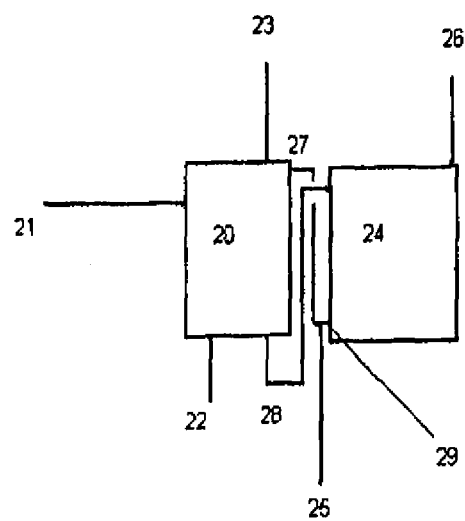
FIG. 4 illustrates an absorption stripping process of FIG. 1 in more detail.

FIG. 4 illustrates an absorption stripping process of the type shown in FIG. 1 in more detail. In contrast to many related processes of the prior art, the process depicted in FIG. 4 includes recirculation.

The $CO_2$ removal unit takes a $CO_2$ gas stream (22) from a carbon dioxide emission source such as flue gas from a power station and passes it through an absorber column (20) where it is contacted with a recirculating solvent stream of potassium carbonate (27) designed to selectively remove carbon dioxide. Up to 90% of the carbon dioxide is removed from the gas stream. Makeup solvent (21) is added to the system, typically at the absorber (20) as shown. Flue gas with residual $CO_2$ (23) is discharged to the atmosphere. Solvent which is rich in carbon dioxide (28), is then processed in a separate $CO_2$ regeneration column (24) which typically draws energy from a power plant for the $CO_2$ removal step. The $CO_2$ regeneration column (24) (i) removes the carbon dioxide as a pure gas stream (26) for geological storage, and (ii) regenerates the lean solvent (29) for recirculation back to the absorber (20). Potassium sulphate and/or nitrate are removed as slip-stream by-products (25) by internal processing steps.

Figure 5:
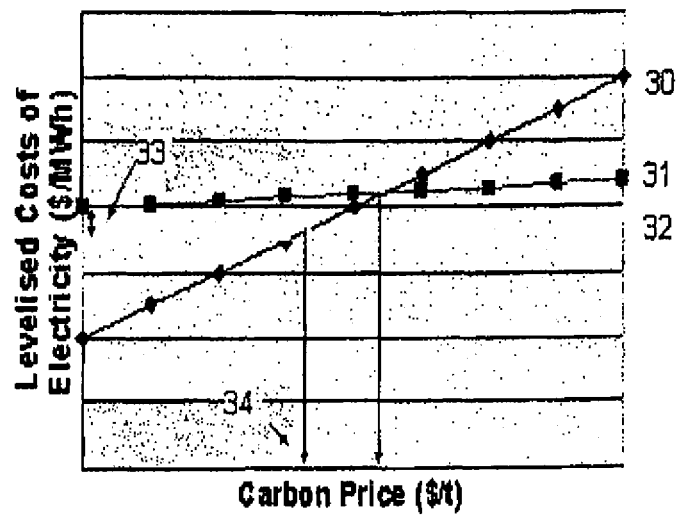
FIG. 5 is a plot of the levelised cost of electricity ($/MWh) against carbon price ($/t) to illustrate the impact of carbon price on the levelised cost of electricity (LCOE) for various power plant cases.

FIG. 5 is a plot of the levelised cost of electricity ($/MWh) against carbon price ($/t). This plot illustrates the impact of carbon price on the levelised cost of electricity (LCOE) for various power plant cases. The base plant which has no capture facilities has a steep LCOE plot (30) because the high $CO_2$ emissions result in costs which are added to the lower base power cost. The base CCS case has a less steep LCOE plot (31) because the majority of the $CO_2$ has been removed at a cost which increases the fundamental LCOE. The plot (32) corresponding to the present invention has a lower fundamental cost due to the added revenues and the LCOE price differential (33) is clearly apparent. This plot also illustrates the potential for earlier adoption (lower carbon price transition) (34). Specifically the different plots indicate that the crossover point with the plant without capture occurs earlier and hence may accelerate introduction of the technology.

Figure 6:
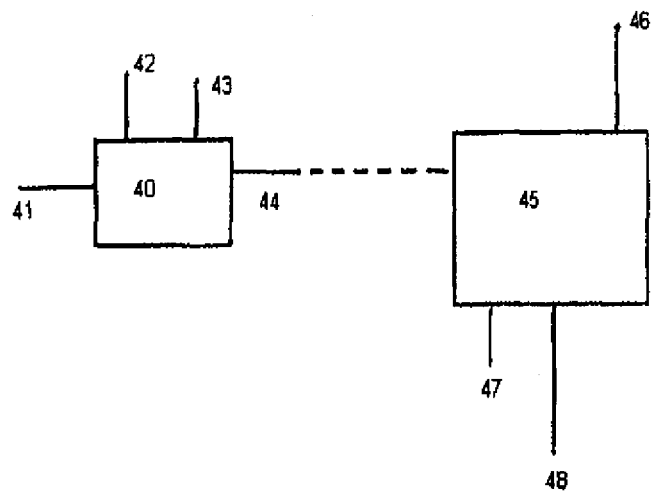
FIG. 6 illustrates certain processes of the prior art that use a once-through hydroxide scrubbing system to produce carbonate products.

FIG. 6 illustrates another process of the prior art of the type disclosed in International patent application WO 2006/034339 that uses a once-through hydroxide scrubbing system to produce carbonate products. Specifically, sodium chloride feed (41) fed to an electrolyser (40) emits chlorine (42) and hydrogen (43) and sodium hydroxide (44). The sodium hydroxide (44) is fed to a $CO_2$ removal unit where it is used for once-through scrubbing (45) of flue gas containing $CO_2$ (47). Flue gas containing residual $CO_2$ (46) is vented to the atmosphere. Sodium carbonate/bicarbonate is a by-product (48) of the scrubbing.

Figure 7:
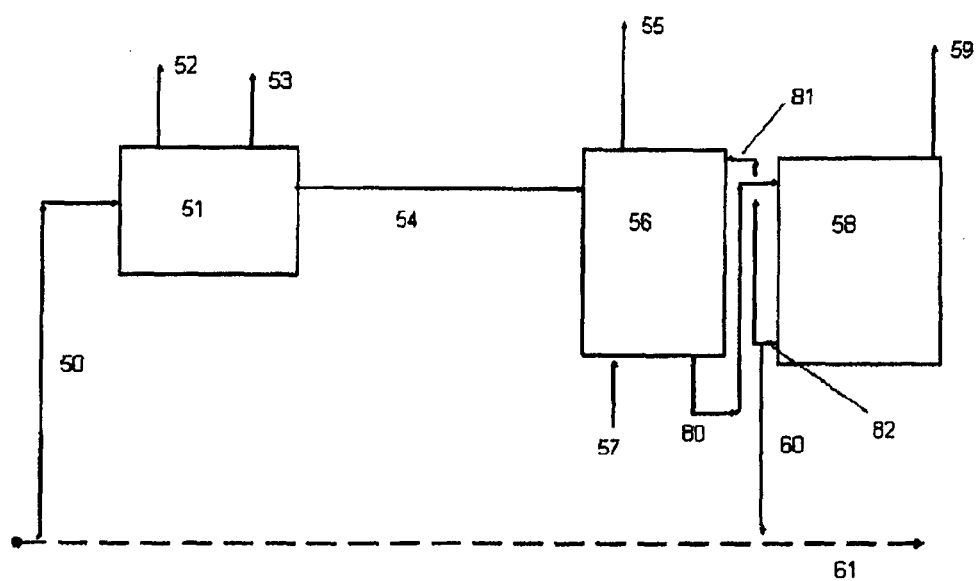
FIG. 7 illustrates one embodiment of the present invention as a carbonate absorption stripping system producing sulphate and/or nitrate products.

FIG. 7 illustrates one embodiment of the application of the present invention as a carbonate absorption stripping system producing sulphate and/or nitrate products. In this embodiment potassium chloride (50) from a potassium supply chain (61) (e.g. fertilizers) is fed to an electrolyser process (51) the produces chlorine (52), hydrogen (53) and potassium hydroxide (54). The makeup potassium hydroxide (54) is fed to a second process, being a $CO_2$ removal unit which has an absorber (56) for scrubbing a $CO_2$ source, such as a flue gas (57) from an industrial process using a recirculating lean carbonate stream (81). Flue gas having residual $CO_2$ (55) is vented to the atmosphere. Solvent which is rich in carbon dioxide (80) leaves the absorber (56) and is then processed in a separate $CO_2$ regenerator (58) which typically draws energy from a power plant for the $CO_2$ removal step. The $CO_2$ regeneration column (58) removes the carbon dioxide as a pure gas stream (59), and regenerates the feed for recirculation of the lean solvent (82) back to the $CO_2$ absorber (56). Potassium sulphate/nitrate by-product(s) (60) are removed from the recirculating solvent stream and fed back into the potassium supply chain (61).

As mentioned previously, prior art processes and technology of the type described in WO 2006/034339 are likely to be constrained by the product markets. To what extent a once-through hydroxide scrubbing process can be widely used depends on specific markets. However, WO 2006/034339 teaches the use of a chemical plant that is many times the size of world class facilities with energy drawn from a single 1000 MW power plant. This would only be 2-3% of, for example, the entire power market of a country such as Australia.

In comparison the use of recirculating carbonate absorption stripping processes (as depicted in FIG. 7) combined with makeup systems sized on replenishment rates resulting from sulphate and nitrate impurities has the potential to fit neatly with existing markets. The diversion of some potassium products to the CCS removal processes, synergistically removing carbon dioxide, and then being returned, with added sulphur and/or nitrogen value, for beneficial use has the potential to create an improved ecological outcome. The extent to which this integration might provide these two outcomes is described in the following example. Suffice to say the present invention provides for the capture of comparatively large quantities of carbon dioxide globally and hence can provide large quantities of low emissions power with CCS within the current production capacity of the potash industry.

EXAMPLE

The present invention will now be further described with reference to the following non-limiting example which illustrates some of the advantages of the invention. The benefits are exemplified by reference to a base case in which a carbonate carbon capture process is applied to the removal of a significant quantity of carbon dioxide and by demonstration of the difference in processing costs that ensue due to impurity removal. As a consequence only differences are included in the calculations below. Details of the capture plant and operating costs which are effectively the same between the two cases are not included. Similarly, the example only includes costs and prices of raw materials and products that are representative of differences between the two cases. It should be noted that the cost and prices cited in the example are indicative of market conditions at one point in time. Furthermore the costs and prices do not incorporate or reflect the impacts of carbon pricing, however it is anticipated that these impacts would not alter the results or conclusions set out herein.

The example is based around a large KCl chlor-alkali plant that would provide the necessary potassium for replacement of potassium consumed by a stoichiometric amount of sulphur in the treated flue gas stream.

The base case is illustrated in FIG. 1 where $K_2CO_3$ is provided as a replacement for consumed potassium and a by-product of $K_2SO_4$ is produced. It should be noted that similar results apply in the base case if KOH is used The invention is illustrated in FIG. 2 where KCl is fed to a chlor-alkali plant producing chlorine, hydrogen and KOH for use in the CCP plant which also produces $K_2SO_4$.

The following analysis examines the net cost position from purchases and sales of chemicals within the processes and incorporates the capex (by way of an annual capital charge) and operating costs for the conversion of KCl to KOH. The relative cash position between the two cases represents the benefit of the present invention.

TABLE 1

| Base Data | |
|---|---|
| Product | Product Pricing (AUD/t) |
| $K_2CO_3$ | $1800 |
| $K_2SO_4$ | $ 600 |
| KCl | $ 300 |
| $Cl_2$ | $ 850 |
| $H_2$ | $ 500 |

TABLE 2

| Chlor Alkali Plant details | |
|---|---|
| Parameter | Consumption/Production |
| KCl used | 227 t/day |
| KOH produced | 173 t/day |
| $Cl_2$ produced | 100 t/day |
| $H_2$ produced | 33,100 m³/day |
| Power used | 350 MWhr/day |

TABLE 2-continued

| Chlor Alkali Plant details | |
|---|---|
| Costs | Value |
| Capital cost | AUD$110 million |
| Capital charge factor | 15% |
| Power cost | 0.04 AUD/kWhr |
| Fixed costs | AUD$5 million pa |

TABLE 3

| Comparative consumption/production | | |
|---|---|---|
| Daily consumption/production | Base Case (tonnes) | Example (tonnes) |
| $K_2CO_3$ | 210 | |
| $K_2SO_4$ | 265 | 265 |
| KCl | | 227 |
| $Cl_2$ | | 100 |
| $H_2$ | | 3 |

Base Case Financials
All figures are cited in Australian dollars (AUD).

$$\text{Cash position} = \text{revenue from sales of } K_2SO_4 - \text{cost of } K_2CO_3$$

$$= (265 \times 600 - 210 \times 1800) \times 365$$

$$= \{-\$80\} \text{ million } pa$$

Invention Case Financials
Cash position=Revenues($K_2SO_4$+$Cl_2$+$H_2$)−Cost of KCl—$Cl_2$ plant cost (capex+opex)

$$\text{Revenues} = ((265 \times 600 + 100 \times 850 + 3 \times 500) - 227 \times 300) \times 365$$

$$= \$64.8 \text{ million } pa$$

$$\text{Chlorine plant costs} = 110 \times .15 + (.35 \times 0.04 \times 365 + 5)$$

$$= \$26.6 \text{ million } pa$$

$$\text{Cash position} = \$64.8 - \$26.6$$

$$= \$38.2 \text{ million } pa$$

$$\text{Differential cash position} = \$38.2 - (-80)$$

$$\$118.2 \text{ million } pa$$

This analysis illustrates the significant advantages of the present invention when compared to the base case. The immediate benefit to the power producer can be demonstrated by applying the differential cash benefit to the sent out power. Based on an assumed power plant configuration having
  220 ppm SOx in flue gas
  Emission intensity of 1.12 t $CO_2$/MWh
  22% parasitic energy for the integrated capture plant
  Chlor-alkali plant as above
the equivalent size of power plant would be approx 1250 MW. Accounting for reduction in power due to the capture plant the annual sent out power will be approximately $8.5 \times 10^5$ MWh.

The reduction in *LCOE* would be approximately= $118.2 × 10⁶/

$$8.5 \times 10^6 \text{MWh}$$

$$\$13.9/\text{MWh}$$

This reduction in LCOE is illustrated by the plot depicted in FIG. 5 and shows the way the present invention could provide incentives for early application of CCS. The financial benefits are overwhelmingly positive and are anticipated to remain positive even when sensitivities for individual components, such as power cost, capital cost, product pricing etc are taken into consideration. Alternative values for the key parameters have been chosen to demonstrate this point. Table 4 shows the revised parameters and the results.

TABLE 4

Alternative performance - revised pricing and results

| Product | Product Pricing (AUD/t) |
|---|---|
| $K_2CO_3$ | $874 |
| $K_2SO_4$ | $210 |
| KCl | $135 |
| $Cl_2$ | $395 |
| $H_2$ | $500 |

| Costs | Value |
|---|---|
| Capital cost | AUD$150 million |
| Power cost | 0.05 AUD/kWhr |
| Fixed costs | AUD$10 million pa |

| Net Benefit ($ million pa) | Reduced LCOE ($/MWh) |
|---|---|
| 32 | 4 |

Similar analyses comparing the impurity removal cost for other capture solvent processes demonstrate the benefits of the present invention as they do not offer revenue benefits.

While this invention has been described in connection with specific embodiments thereof, it will be understood that it is capable of further modification(s). This application is intended to cover any variations uses or adaptations of the invention following in general, the principles of the invention and including such departures from the present disclosure as come within known or customary practice within the art to which the invention pertains and as may be applied to the essential features hereinbefore set forth.

As the present invention may be embodied in several forms without departing from the spirit of the essential characteristics of the invention, it should be understood that the above described embodiments are not to limit the present invention unless otherwise specified, but rather should be construed broadly within the spirit and scope of the invention as defined in the appended claims. The described embodiments are to be considered in all respects as illustrative only and not restrictive.

Various modifications and equivalent arrangements are intended to be included within the spirit and scope of the invention and appended claims. Therefore, the specific embodiments are to be understood to be illustrative of the many ways in which the principles of the present invention may be practiced. In the following claims, means-plus-function clauses are intended to cover structures as performing the defined function and not only structural equivalents, but also equivalent structures.

It should also be noted that where a flowchart is used herein to demonstrate various aspects of the invention, it should not be construed to limit the present invention to any particular logic flow or logic implementation.

"Comprises/comprising" and "includes/including" when used in this specification is taken to specify the presence of stated features, integers, steps or components but does not preclude the presence or addition of one or more other features, integers, steps, components or groups thereof. Thus, unless the context clearly requires otherwise, throughout the description and the claims, the words 'comprise', 'comprising', 'includes', 'including' and the like are to be construed in an inclusive sense as opposed to an exclusive or exhaustive sense; that is to say, in the sense of "including, but not limited to".

The invention claimed is:

1. A method of removing carbon dioxide from an industrial emission by absorbing carbon dioxide, comprising the steps of:
   converting a potassium compound from a first industry into potassium hydroxide using energy from a second industry, wherein a locus of the second industry is adjacent a locus of the converting step;
   absorbing carbon dioxide from emissions from the second industry by contacting the emissions with a potassium carbonate-containing absorption solution in an absorption column of a carbonate absorption/stripping system to produce a potassium bicarbonate-containing rich solution;
   reacting sulphur oxides from emissions from the second industry with potassium carbonate of the potassium carbonate-containing absorption solution and oxygen to produce potassium sulphate and/or reacting nitrogen oxides from emissions from the second industry with potassium carbonate of the potassium carbonate-containing absorption solution and oxygen to produce potassium nitrate;
   feeding the potassium hydroxide to the carbonate absorption/stripping system to provide makeup potassium to the potassium carbonate-containing absorption solution;
   removing absorbed carbon dioxide from the potassium bicarbonate-containing rich solution as carbon dioxide by converting the potassium bicarbonate to potassium carbonate in a regeneration column of the carbonate absorption/stripping system to regenerate the potassium carbonate-containing absorption solution;
   recycling the regenerated potassium carbonate-containing absorption solution to the absorbing step;
   recovering potassium sulfate and/or potassium nitrate from the carbonate absorption/stripping system;
   providing at least part of the recovered potassium sulfate and/or potassium nitrate to the first industry; and
   wherein the first industry is a fertilizer industry and the second industry is a power industry.

2. The method according to claim 1, wherein the feeding step comprises:
   reacting the potassium hydroxide with carbon dioxide from emissions from the second industry to form a potassium carbonate, said potassium carbonate providing makeup potassium carbonate to the absorption solution.

3. The method according to claim 1 wherein the potassium compound is potassium chloride.

4. The method according to claim 1, further comprising recovering at least one product from the converting step.

5. The method according to claim 4 wherein the at least one product recovered from the converting step is one or more selected from the group consisting of chlorine gas, hydrogen and hydrogen chloride.

6. The method according to claim 5, wherein at least part of one or more selected from the group consisting of the potassium sulfate, the potassium nitrate and at least one product recovered from the converting step is feed for an industrial process.

7. The method according to claim 5, wherein at least part of one or more selected from the group consisting of the potassium sulfate, the potassium nitrate and at least one product recovered from the converting step comprises or is included in a commercial product.

\* \* \* \* \*